US006989927B2

(12) United States Patent
Bonaventura

(10) Patent No.: US 6,989,927 B2
(45) Date of Patent: Jan. 24, 2006

(54) STAGE WELL

(75) Inventor: Russell Bonaventura, Williamsville, NY (US)

(73) Assignee: Leica Microsystems Inc., Buffalo, NY (US)

( * ) Notice: Subject to any disclaimer, the term of this patent is extended or adjusted under 35 U.S.C. 154(b) by 95 days.

(21) Appl. No.: 10/604,233

(22) Filed: Jul. 2, 2003

(65) Prior Publication Data

US 2005/0002093 A1    Jan. 6, 2005

(51) Int. Cl.
    *G02B 21/26* (2006.01)
(52) U.S. Cl. .................... 359/391; 359/393; 359/368
(58) Field of Classification Search ........ 359/368–398, 359/694–706, 800–830; 435/288.3, 288.7
    See application file for complete search history.

(56) References Cited

U.S. PATENT DOCUMENTS

| | | | | |
|---|---|---|---|---|
| 2,448,974 A | * | 9/1948 | Guttmann .................... | 359/383 |
| 2,960,913 A | * | 11/1960 | Herrala ........................ | 359/382 |
| 4,097,116 A | * | 6/1978 | Kuroha ........................ | 359/393 |
| 4,477,157 A | | 10/1984 | Gaul ........................... | 359/394 |
| 4,955,702 A | * | 9/1990 | Nakamura .................. | 359/418 |
| 5,054,886 A | * | 10/1991 | Ozaki et al. ................. | 359/823 |
| 5,691,841 A | * | 11/1997 | Ohsaki et al. .............. | 359/391 |
| 6,560,012 B2 | * | 5/2003 | Adachi et al. .............. | 359/368 |
| 6,628,459 B2 | * | 9/2003 | Ue .............................. | 359/392 |

FOREIGN PATENT DOCUMENTS

JP    10-311952    * 11/1998    .................. 359/391

OTHER PUBLICATIONS

English translation of the Japanese reference No. 10-311952.*

* cited by examiner

*Primary Examiner*—Thong Q Nguyen
(74) *Attorney, Agent, or Firm*—Simpson & Simpson, PLLC

(57)    ABSTRACT

A new arrangement for the revolving stage of a polarizing microscope is presented. A stage well adapted to be removably fitted into and attached to the center of a revolving stage is provided with a housing, an inner sleeve adapted to fit within the housing and to move vertically within the housing, and a sample platform. In a preferred embodiment, the inner sleeve also moves rotationally. The stage well extends below the upper surface of the revolving stage with sufficient clearance to avoid interference with condenser and/or other components present below the revolving stage. Also presented is a microscope stage assembly comprising a revolving stage and a stage well attached to a center opening in the microscope revolving stage.

20 Claims, 7 Drawing Sheets

STAGE WELL

FIELD OF THE INVENTION

The present invention relates generally to microscopy, more specifically to microscopes, and, even more particularly, to stage wells for microscope stages.

BACKGROUND OF THE INVENTION

Although opaque or solid matter blocks the transmission of light through the body or volume of opaque material, microscopes are still utilized to examine the surface of such solid materials. While opaque samples are often macroscopic, their size is such that they are often difficult to manipulate by hand. For example, prior to microscopic examination, the surface to be examined must be polished. The size of most samples prohibits the necessary polishing of a sample that is held by hand. For this reason, macroscopic samples are mounted or attached to a support of sufficient length to allow a person to hold a sample comfortably by hand and manipulate it to carry out the required polishing operations.

The samples are usually attached permanently to the sample supports effectively making the support integral with the sample placed under the microscope. Consequently, the sample surface to be examined is often more than one centimeter above the level of the microscope stage. This height frequently decreases the available distance that is required to move the microscope objective into focus. This problem becomes enhanced as the longer higher power objectives are positioned over the sample. Often, there is not enough clearance to bring the objective into position over the sample-sample support assembly.

U.S. Pat. No. 4,477,157 to Gaul attempts to solve this problem by providing a double revolving microscope stage. Vertical adjustment means are provided to allow the bottom stage to be raised or lowered vertically without rotating the stage. The '157 patent provides separate vertical and rotational controls using pinion and gear mechanisms that are controlled using knurled knobs.

Although the '157 patent enables examination of crystal-optical and other opaque samples, it does not provide a simple method for manipulating the sample. The double revolving stage assembly is bulky, awkward and requires precise machining of numerous small parts. In addition, the several control knobs are placed on top of the stage or at the side of the stage. The proximity of the controls to the sample increases the likelihood of a user unintentionally moving or damaging the sample when trying to move the stage.

What is needed, then, is a revolving stage that allows for the creation of sufficient distance between macroscopic samples or support mounted samples and microscope objectives, especially medium power and high power objectives, such as 40× and 100×, respectively. Moreover, what is further required is a method and apparatus to manipulate the sample and stage to satisfactorily perform microscopic examinations of opaque samples without undue interference with the sample itself.

SUMMARY

The present invention broadly comprises a microscope stage well operatively arranged to hold an opaque sample within the center of a revolving microscope stage and within an illumination beam path. The stage well includes a housing, an inner sleeve fitting within the housing such that it is able to rotate within the housing, and a platform extending transversely within the inner sleeve.

The invention also comprises, in combination, a stage well contained including a housing, an inner sleeve fitting within the housing such that it is able to rotate within the housing, and a platform extending transversely within the inner sleeve and microscope revolving stage with the revolving stage adapted to receive the stage well.

A general object of the invention is to provide a sample holder that is detachably mounted to the revolving stage of a microscope.

A second object of the invention is to provide a sample holder that allows for sufficient clearance between the sample and the microscope objective(s).

An additional object is to provide for efficient and easy movement of a sample without placing movement controllers on or above the upper surface of the revolving stage.

These and other objects, features, and advantages of the present invention will become readily apparent to those having ordinary skill in the art upon reading the following detailed description of the invention in view of the several drawings of the invention.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments.

The present invention broadly comprises a microscope assembly including a microscope having a revolving stage, a light source, and a stage well secured to the revolving stage and adapted to receive opaque samples for microscopic examination. In one embodiment, the light source is a polarizing light source. A polarizing compound microscope is shown in perspective view in FIG. 1.

Figure 1:
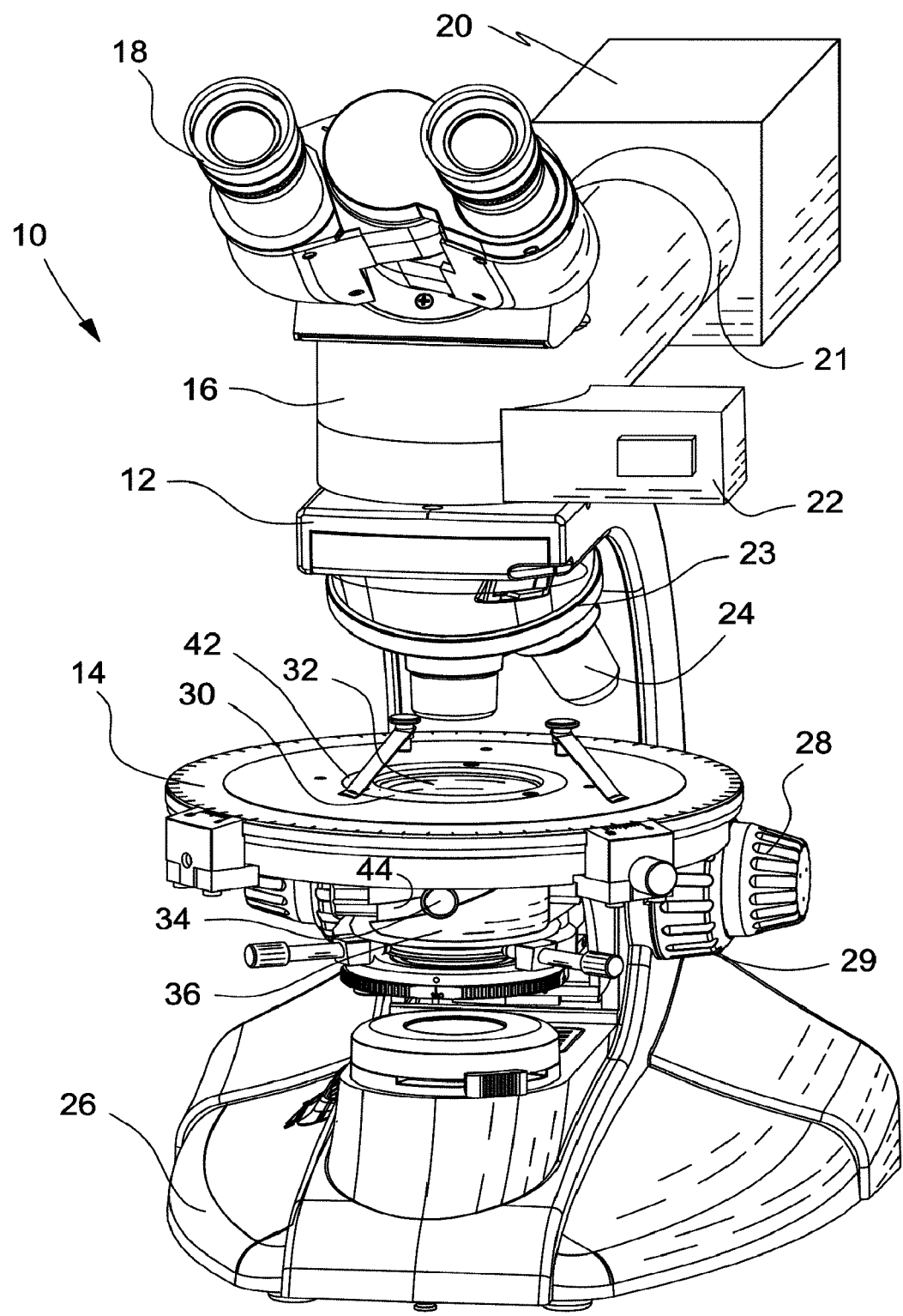
FIG. 1 is a front perspective view of a typical compound microscope with which the stage well of the present invention is adapted for use.

FIG. 1 is a front perspective view depicting a polarizing microscope 10. Base 26 is seen to support eyepiece 12. Eyepiece 12 holds turret 23 which in turn is connected to a plurality of microscope objectives 24. Turret 23 is adapted to enable the user to select the desired objective 24 by turning turret 23 until the desired objective 24 is positioned over revolving stage 14. Revolving stage 14 is designed to receive stage well 30. Flange 42 is secured to revolving stage 14 using screws or other fasteners well known to those skilled in the art. Focus adjustments 28 and 29 move revolving stage 14 vertically in relation to microscope base 26. Stage well housing 36 is seen extending below revolving stage 14 of microscope 10. Housing 36 defines groove 44. Handle 34 is seen extending through groove 44.

Incident light illuminator 16 and reflected light source 20 are attached to microscope 10 below eye lens 18 by means of connector 21. Incident light illuminator 16 and reflected light source 20 are operatively connected to filter cube slider 22. Filter cube slider 22 can be utilized to move different filter cubes into the illumination beam path.

Figure 2:
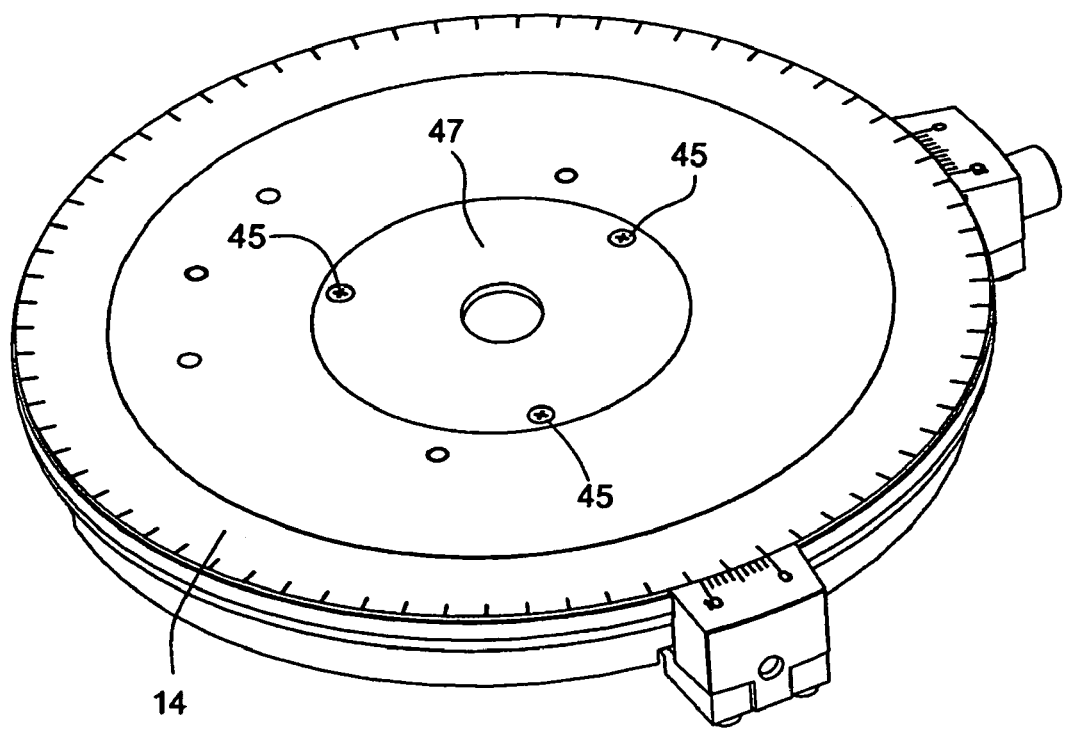
FIG. 2 is a top perspective view of a revolving microscope stage including a removable center plate.

FIG. 2 is a top perspective view of revolving stage 14 showing center plate 47. Center plate 47 is removable to enable revolving stage 14 to receive stage well 30 (not shown in FIG. 2). In the preferred embodiment shown, revolving stage 14 is round although revolving stage 14 may be configured into other suitable shapes. Fasteners 45 are shown holding center plate 47 onto revolving stage 14.

Figure 3:
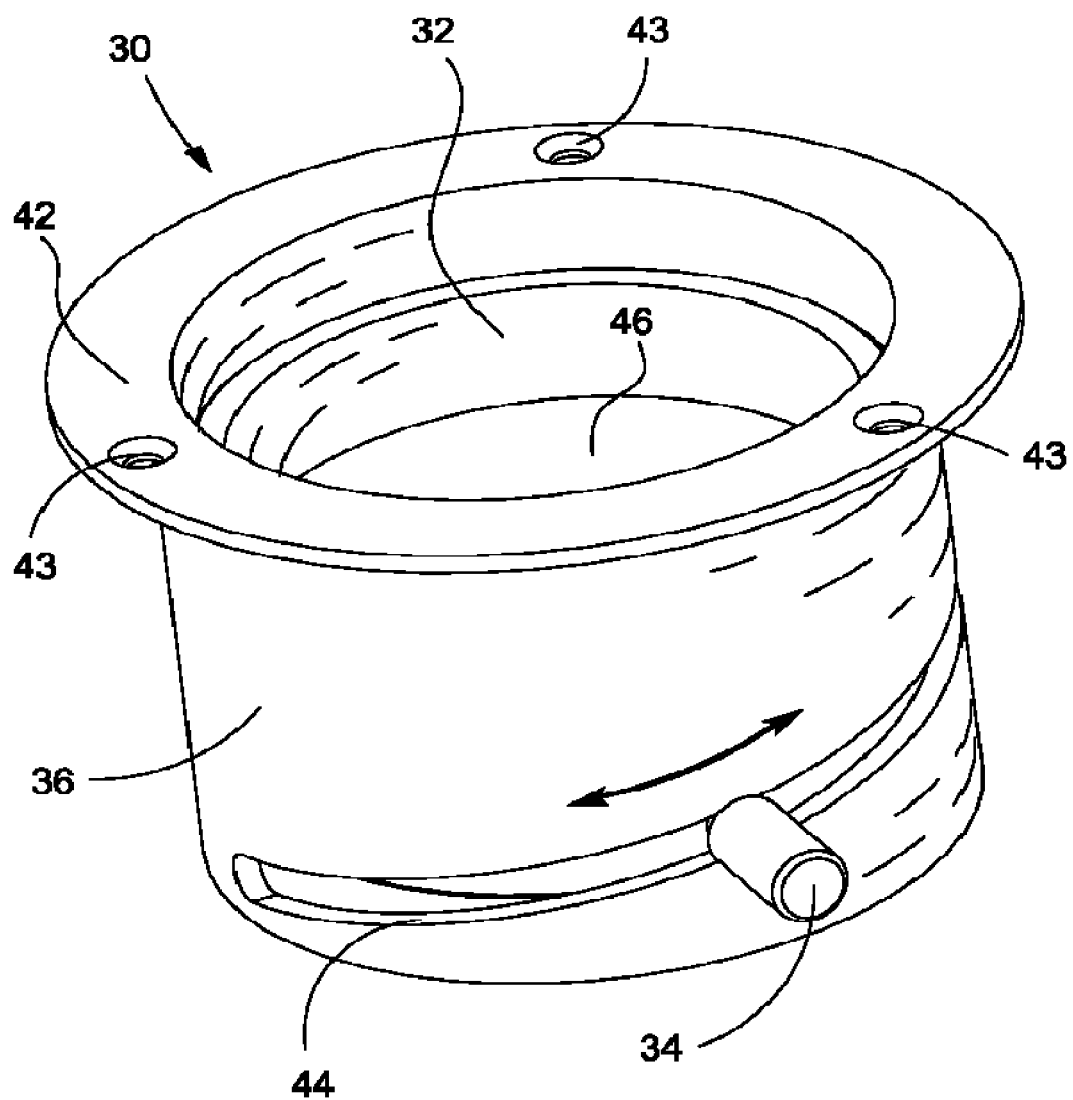
FIG. 3 is a top perspective view of the stage well of the present invention.
Figure 5:
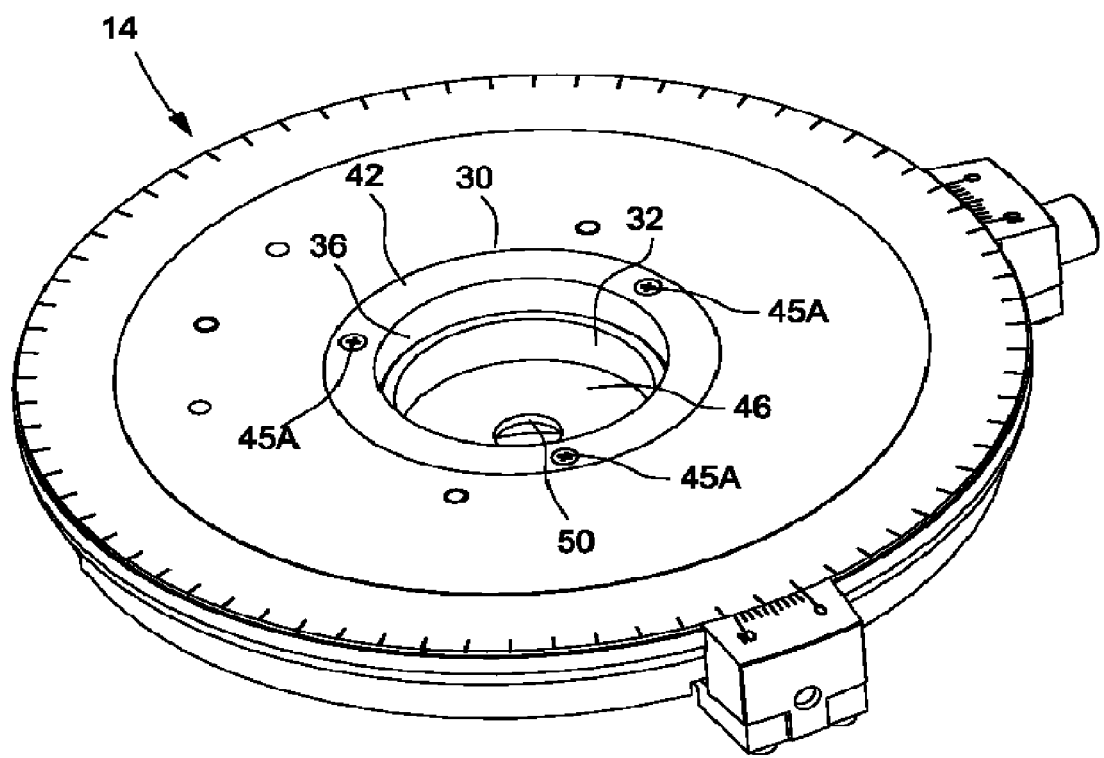
FIG. 5 is a top perspective view of the revolving microscope stage with the center plate removed and the stage well of the present invention containing a sample and fastened to and extending from the center space of the microscope revolving stage.

FIG. 3 is a top perspective view of stage well 30 of the present invention. Housing 36 includes flange 42 which rests on revolving stage 14. Flange 42 defines at least one hole 43. In a preferred embodiment, flange 42 defines a plurality of holes 43. Holes 43 are positioned on flange 42 to align with the receiving holes on revolving stage 14 that receive fasteners 45 to secure center plate 47. Fasteners 45A are shown in FIG. 5 removably securing stage well 30 to revolving stage 14. In a preferred embodiment, fasteners 45A are screws.

Inner sleeve 32 fits within housing 36 and is adapted to rotate within housing 36. Housing 36 defines groove 44. Handle 34 extends through groove 44 and is attached to inner sleeve 32. Handle 34 may be attached by several methods known in the art, including, but not limited to, welding or brazing. In a preferred embodiment, handle 34 is removably attached to inner sleeve 32. Platform 46 is shown extending transversely within the cylindrical inner sleeve 32. In other configurations, platform 46 extends transversely between opposite walls of inner sleeve 32. In a preferred embodiment, inner sleeve 32 is adapted to threadably receive handle 34. By removing handle 34 from inner sleeve 32, stage well 30 is removed from revolving stage 14 after removing fasteners 45A and handle 34 and lifting stage well 30 out of the center hole of revolving stage 14.

Inner sleeve 32 is adapted to move vertically within housing 36. Movement is actuated by handle 34 moving within groove 44. In one embodiment, groove 44 is vertically aligned along the wall of housing 36 enabling a vertical movement of inner sleeve 32 with relatively little rotational movement. In the embodiment shown in FIG. 3, handle 34 moves within helical groove 44 to enable a rotational movement to accompany the vertical movement of inner sleeve 32.

Figure 4:
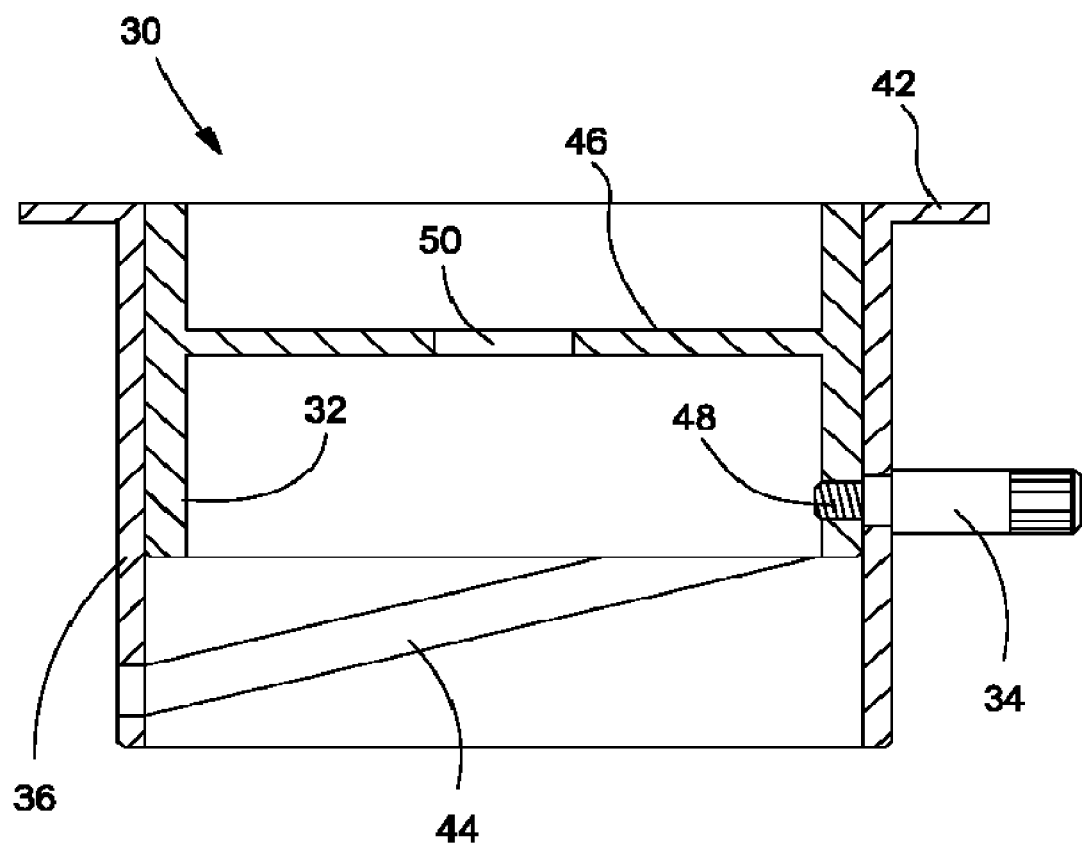
FIG. 4 is a partial cross section of the present invention showing the inner sleeve situated within the housing of the stage, a helical groove cut into and extending through the wall of the housing and a handle extending through the groove and attached to the inner sleeve.

FIG. 4 is a partial cross section view of stage well 30. Handle 34 is shown extending through groove 44 and attached to inner sleeve 32. A preferred embodiment is shown in FIG. 4 depicting threads 48 on one end of handle 34 extending through and threadably attached to inner sleeve 32. Indicator 50 is shown on platform 46. In a preferred embodiment, indicator 50 marks the position upon which an illumination beam from light source 20 will strike platform 46. Indicator 50 designates the point on platform 46 where samples to be examined are preferably placed. In a more preferred embodiment, indicator 50 will be in the center of platform 46.

FIG. 5 is a top perspective view of stage well 30 contained within revolving stage 14. Flange 42 is shown contacting revolving stage 14. Fasteners 45A attach stage well 30 to revolving stage 14. Platform 46 extends transversely across inner sleeve 32. Also seen is indicator 50 on platform 46. It can be readily seen that platform 46 is in a lower position relative to revolving stage 14.

Figure 6:
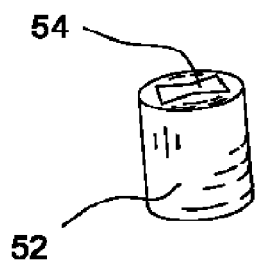
FIG. 6 is a top perspective view of a sample holder holding a sample.
Figure 7:
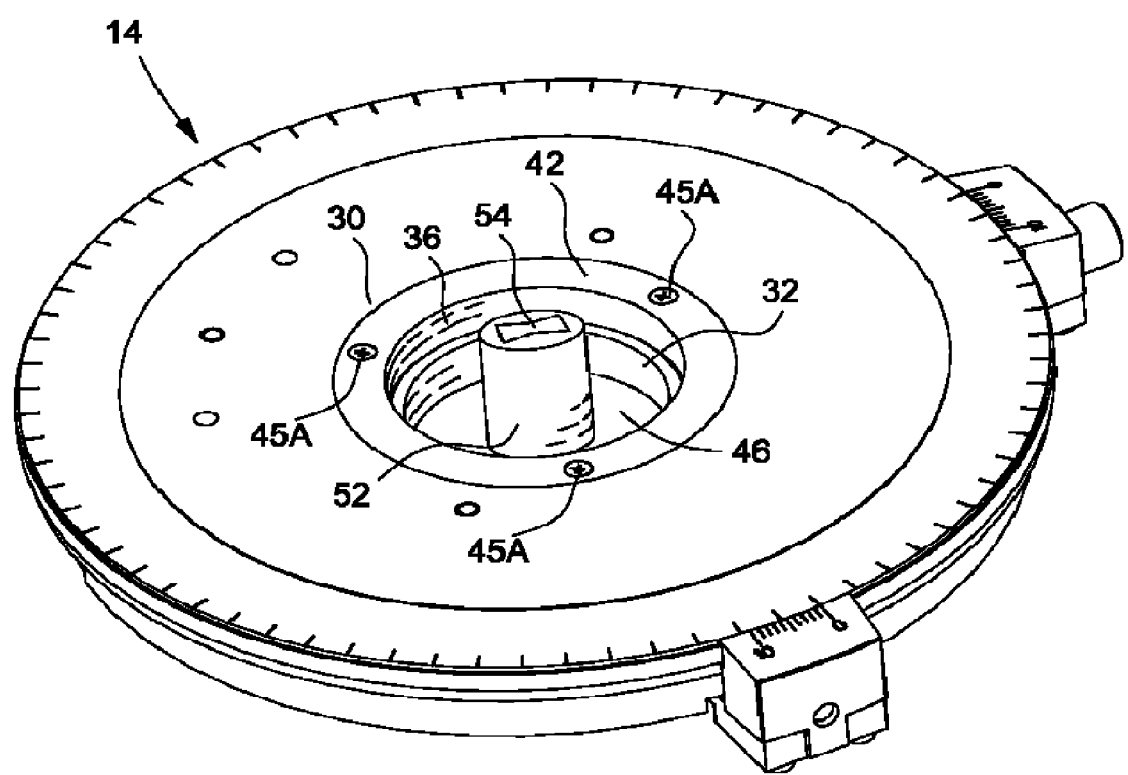
FIG. 7 is a top perspective view of the stage well of the present invention holding a sample and attached to the revolving microscope stage; and, FIG. 8 is a front perspective view of the revolving stage-stage well assembly containing a sample as seen within a typical microscope.

FIG. 6 depicts a typical sample support 52 used to support sample 54. Although depicted in FIG. 6 as a cylinder, sample support 52 can be configured into other shapes. FIG. 7 demonstrates the placement of sample support 52 in stage well 30. In a preferred embodiment, sample support 52 is placed over indicator 50 (not shown) on platform 46.

Figure 8:
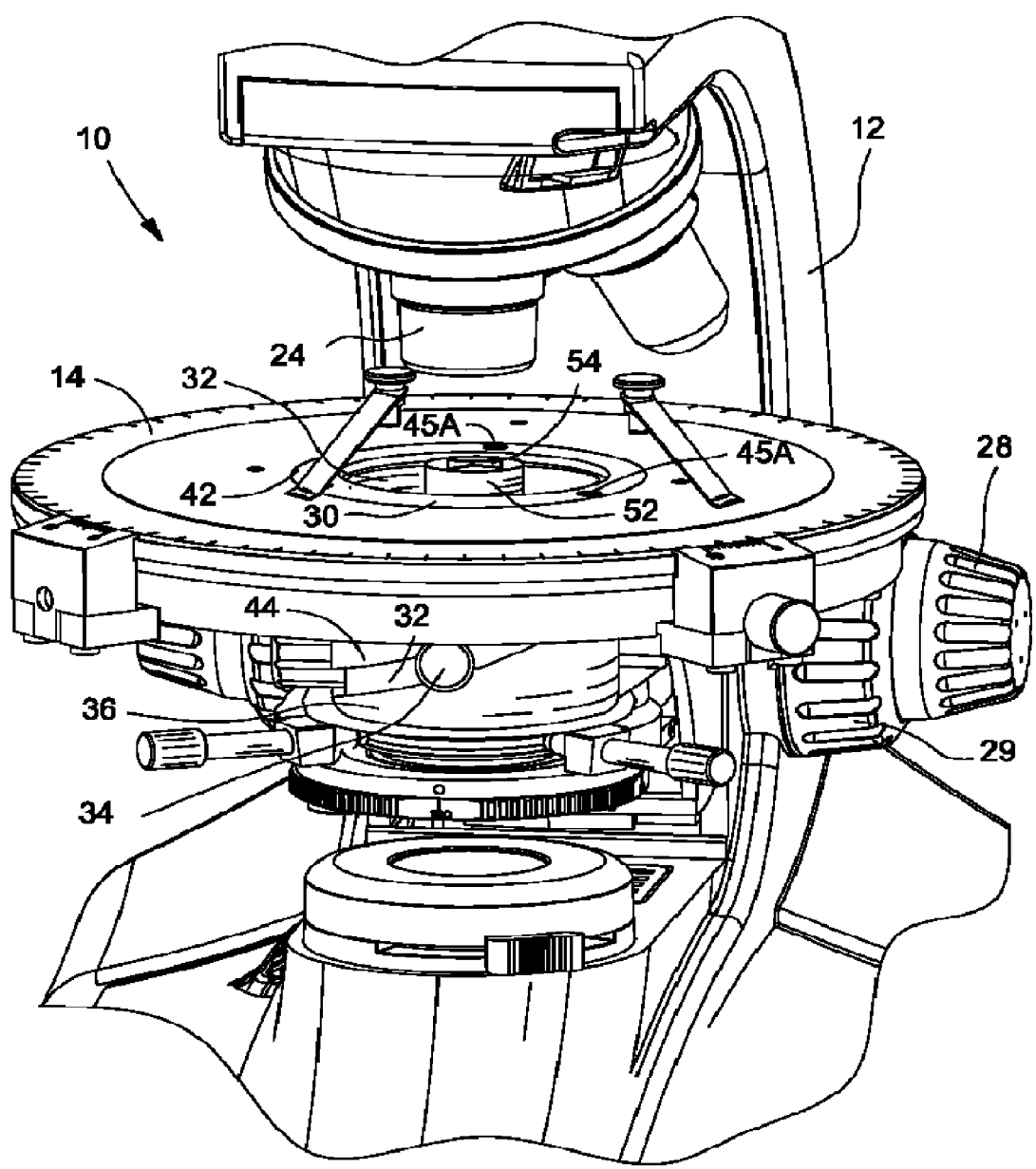

FIG. 8 illustrates the microscope stage assembly of the present invention as seen in microscope 10. Objective 24 is placed in positioned over sample 54 which is supported by sample support 52. Flange 42 of stage well 30 is secured to revolving stage 14 by fasteners 45A. Below revolving stage 14 can be seen groove 44 cut through housing 36 of stage well 30. Handle 34 is attached to inner sleeve 32. Sample support 52 is moved vertically by movement of handle 34 along groove 44. In the embodiment shown, groove 44 is helical. Movement of handle 34 along helical groove 44 causes a rotation of sample support 52 along with the vertical movement. In an alternative embodiment, groove 44 may be vertical, that is perpendicular to the plane of revolving stage 14. Movement of handle 34 along a vertical groove 44 will result in relatively little rotational movement when compared to the rotation that accompanies the vertical movement along a helical groove.

Thus it is seen that the objects of the invention are efficiently obtained, although changes and modifications to the invention should be readily apparent to those having ordinary skill in the art, which changes are considered to be within the scope of the invention as claimed.

What is claimed is:

1. A stage well for a microscope stage comprising:
    a housing, said housing attached to said stage and configured to extend below said stage;
    an inner sleeve fitting within said housing such that it rotates within said housing; and,
    a shelf extending transversely within said inner sleeve.
2. The stage well as recited in claim 1 wherein said housing further comprises a flange.
3. The stage well as recited in claim 2 wherein said flange defines at least one hole adapted to receive a fastener.
4. The stage well as recited in claim 1 further comprising:
    a groove defined by a wall of said housing; and,
    a handle extending through said groove, wherein said handle is secured to said inner sleeve.
5. The stage well as recited in claim 4 wherein said groove is vertical.
6. The stage well as recited in claim 4 wherein said groove is helical.

7. The stage well as recited in claim 4 wherein said handle is threadably secured to said inner sleeve.

8. The stage well as recited in claim 1 wherein said shelf further comprises a center indicator.

9. A microscope stage assembly comprising:
- a revolving stage, said revolving stage having a center opening; and,
- a stage well placed within said center opening, said stage well having:
  - a housing, said housing extending below said revolving stage;
  - an inner sleeve fitting within said housing such that it rotates within said housing; and,
  - a shelf extending transversely within said inner sleeve.

10. The microscope stage assembly as recited in claim 9 wherein said housing further comprises a flange.

11. The microscope stage assembly as recited in claim 10 wherein said flange defines at least one hole adapted to receive a fastener.

12. The microscope stage assembly as recited in claim 9 further comprising:
- a groove defined by a wall of said housing; and,
- a handle extending through said groove, wherein said handle is secured to said inner sleeve.

13. The microscope stage assembly as recited in claim 12 wherein said groove is vertical.

14. The microscope stage assembly as recited in claim 12 wherein said groove is helical.

15. The microscope stage assembly as recited in claim 12 wherein said handle is threadably secured to said inner sleeve.

16. The microscope stage assembly as recited in claim 9 wherein said shelf further comprises a center indicator.

17. A microscope stage assembly comprising:
- a revolving stage, said revolving stage having a center opening; and,
- a stage well placed within said center opening, said stage well having:
  - a housing;
  - an inner sleeve fitting within said housing such that it rotates within said housing;
  - a shelf extending transversely within said inner sleeve;
  - a groove defined by a wall of said housing; and,
  - a handle extending through said groove, wherein said handle is secured to said inner sleeve.

18. The microscope stage assembly as recited in claim 17 wherein said groove is vertical.

19. The microscope stage assembly as recited in claim 17 wherein said groove is helical.

20. The microscope stage assembly as recited in claim 17 wherein said handle is threadably secured to said inner sleeve.

* * * * *